United States Patent
Harik et al.

(10) Patent No.: US 10,719,565 B2
(45) Date of Patent: *Jul. 21, 2020

(54) SOFT MATCHING USER IDENTIFIERS (71) Applicant: Facebook, Inc., Menlo Park, CA (US)

(72) Inventors: Hisham Rabih Harik, Palo Alto, CA (US); Kiranjit Singh Sidhu, East Palo Alto, CA (US); Hao Xu, Palo Alto, CA (US); Javier Olivan Lopez, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/706,869

(22) Filed: Sep. 18, 2017

(65) Prior Publication Data

US 2018/0025082 A1    Jan. 25, 2018

Related U.S. Application Data

(63) Continuation of application No. 14/844,248, filed on Sep. 3, 2015, now Pat. No. 9,798,812, which is a continuation of application No. 13/597,126, filed on Aug. 28, 2012, now Pat. No. 9,154,575.

(51) Int. Cl.
*G06Q 50/00*   (2012.01)
*G06F 16/951*  (2019.01)
*H04L 29/08*   (2006.01)
*G06Q 30/00*   (2012.01)
*H04L 12/58*   (2006.01)
*H04W 4/80*    (2018.01)

(52) U.S. Cl.
CPC ......... *G06F 16/951* (2019.01); *G06Q 30/01* (2013.01); *G06Q 50/01* (2013.01); *H04L 51/32* (2013.01); *H04L 67/306* (2013.01); *H04W 4/80* (2018.02)

(58) Field of Classification Search
CPC ..... G06F 16/951; G06F 16/337; G06Q 30/01; G06Q 30/0241; G06Q 30/0269; G06Q 30/02; G06Q 50/01; H04L 51/32; H04L 67/306; H04L 67/22; H04W 4/80
See application file for complete search history.

(56) References Cited

U.S. PATENT DOCUMENTS

| 2010/0082660 A1* | 4/2010 | Muilenburg | G06F 16/337 707/768 |
| 2011/0111738 A1* | 5/2011 | Jones | G06Q 30/02 455/414.1 |
| 2011/0295899 A1* | 12/2011 | James | H04L 67/306 707/784 |

(Continued)

*Primary Examiner* — Le H Luu
(74) *Attorney, Agent, or Firm* — Baker Botts L.L.P.

(57) ABSTRACT

Particular embodiments may receive one or more data items associated with a first user of a social-networking system. The one or more data items being related to an entity. One or more data stores may store a social graph of the social-networking system. The social graph may comprise a plurality of nodes and plurality of edges between nodes. The nodes may comprise user nodes corresponding to users of the social-networking system and concept nodes corresponding to concepts. Particular embodiments may identify one or more nodes of the social graph that likely match the entity and associate at least one of the data items to at least one of the identified nodes.

20 Claims, 6 Drawing Sheets

(56) References Cited

U.S. PATENT DOCUMENTS

| | | | |
|---|---|---|---|
| 2012/0047022 A1* | 2/2012 | Shamim | G06Q 30/0269 |
| | | | 705/14.66 |
| 2012/0084349 A1* | 4/2012 | Lee | G06Q 30/02 |
| | | | 709/203 |
| 2012/0215584 A1* | 8/2012 | Narsude | G06Q 20/202 |
| | | | 705/7.29 |
| 2012/0271691 A1* | 10/2012 | Hammad | G06Q 10/10 |
| | | | 705/14.17 |
| 2013/0080498 A1* | 3/2013 | Desilva | H04L 67/22 |
| | | | 709/201 |
| 2013/0124628 A1* | 5/2013 | Weerasinghe | G06Q 30/0241 |
| | | | 709/204 |
| 2013/0275228 A1* | 10/2013 | Milazzo | G06Q 30/0269 |
| | | | 705/14.66 |
| 2014/0372871 A1* | 12/2014 | Song | G06F 17/212 |
| | | | 715/234 |

* cited by examiner

SOFT MATCHING USER IDENTIFIERS

PRIORITY

This application is a continuation under 35 U.S.C. § 120 of U.S. patent application Ser. No. 14/844,248 filed on 3 Sep. 2015, which is a continuation of U.S. patent application Ser. No. 13/597,126 filed 28 Aug. 2012, now U.S. Pat. No. 9,154,575 B2, issued on 6 Oct. 2015, which are incorporated herein by reference in their entirety.

TECHNICAL FIELD

This disclosure generally relates to social graphs, and, more particularly, to identifying users in association with a social graph.

BACKGROUND

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

DESCRIPTION OF EXAMPLE EMBODIMENTS

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various system, including the social-networking system. For example, the user may provide his name, profile picture, city of residence, contact information (e.g., a phone number, an email address), birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social-networking system to create a concept node comprising information associate with the concept. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as photo sharing, on-line calendars and events, instant messaging, and advertising. For example, the social-networking system may also include media sharing capabilities. For example, the social-networking system may allow users to post photographs and other multimedia files to a user's profile page (typically known as wall posts) or in a photo album, both of which may be accessible to other users of the social-networking system. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users. For example, the social-networking system may maintain an address book for a user. An address book may contain one or more contacts (e.g., a person or a business identify) and for each contact, contact information for the contact (e.g., a phone number, a user identifier for an instant messaging or IM service, an email address, a user identifier for a social-networking system, home address, or any suitable unique identifier of any suitable communication channel).

Figure 1:
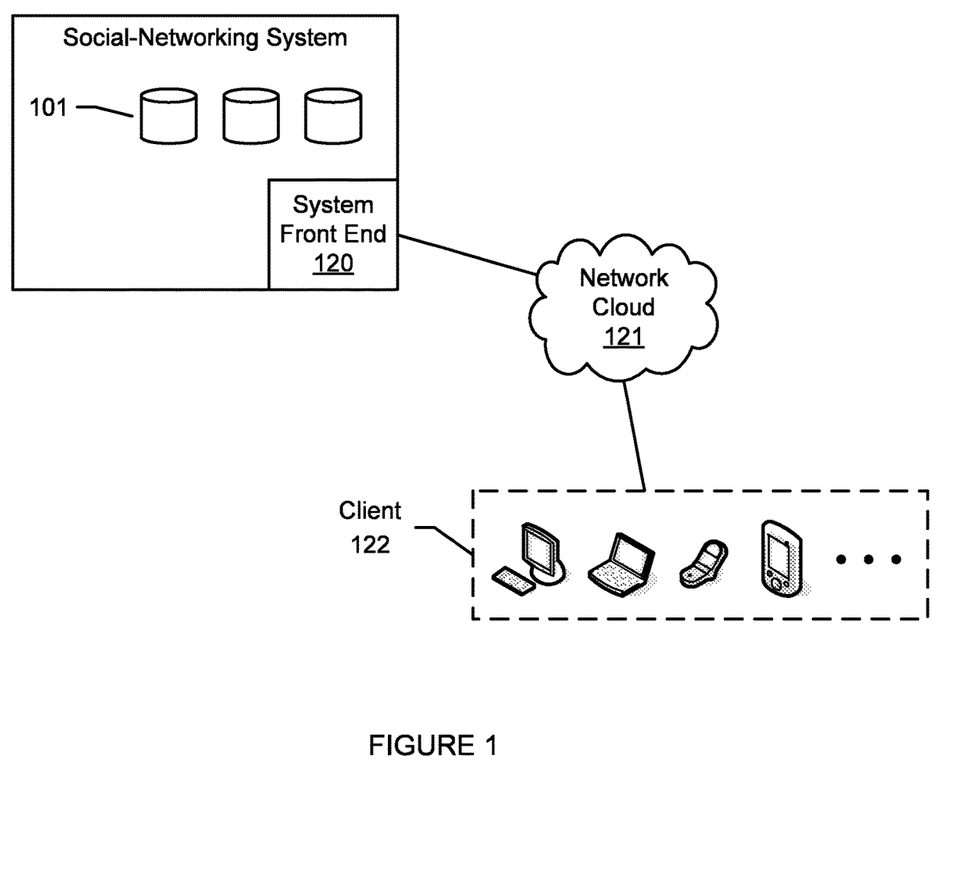
FIG. 1 illustrates an example network environment of a social-networking system.

FIG. 1 illustrates an example network environment of a social-networking system. In particular embodiments, a social-networking system may comprise one or more data stores 101. For example, each data store 101 may comprise one or more storage devices. In particular embodiments, the social-networking system may store in data stores 101 a social graph comprising user nodes, concept nodes, and edges between nodes as described earlier. Each user node may comprise one or more data objects corresponding to information associated with a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 101 may be operably connected to the social-networking system's front end 120. A user of the social-networking system may access the social-networking system using a client device such as client device 122. In particular embodiments, front end 120 may interact with client device 122 through network cloud 121. For example, front end 120 may be implemented in software programs hosted by one or more computing devices of the social-networking system. Front end 120 may include web or HTTP server functionality, as well as other functionality, to allow users to access the social-networking system.

Client device 122 may be a desktop computer, laptop computer, tablet computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 121 may represent a network or collection of networks (such as the Internet, a corporate intranet, a virtual private network, a local area network, a wireless local area network, a cellular network, a wide area network, a metropolitan area network, or a combination of two or more such networks) over which client devices 122 may access the social network system.

In particular embodiments, the social-networking system may store in data stores 101 data associated with applications and services provided by the social-networking system. In particular embodiments, the social-networking system may store user event data in data stores 101. For example, a user may register a new event by accessing a client application to define an event name, a time and a location, and cause the newly created event to be stored (e.g., as a concept node) in data stores 101. For example, a user may register with an existing event by accessing a client application to confirming attending the event, and cause the confirmation to be stored in data stores 101. For example, the social-networking system may store the confirmation by creating an edge in a social graph between a user node corresponding to the user and a concept node corresponding to the event, and store the edge in data stores 101. In particular embodiments, the social-networking system may store in data stores 101 an address book for a user. The user can access the address book through the social-networking system's web site, or through a client application hosted by a client device 122. For example, a user may keep an address book in a client application hosted by the user's personal computer (e.g., Microsoft Outlook) or keep an address book in a native address book application supported by the user's mobile phone. For example, a user may keep an address book hosted over the Internet by a remote server (i.e., the address book is hosted "in the cloud") and access the address book via a web browser on a client device 122. The social-networking system or the client device 122 may also include functionality that allows importing or synchronization of address book contact information. For example, a user may upload or import contact information, from an address book stored in the user's mobile phone, to the social-networking system, causing the social-networking system to store the contact information in the user's address book stored in data stores 101.

Figure 2:
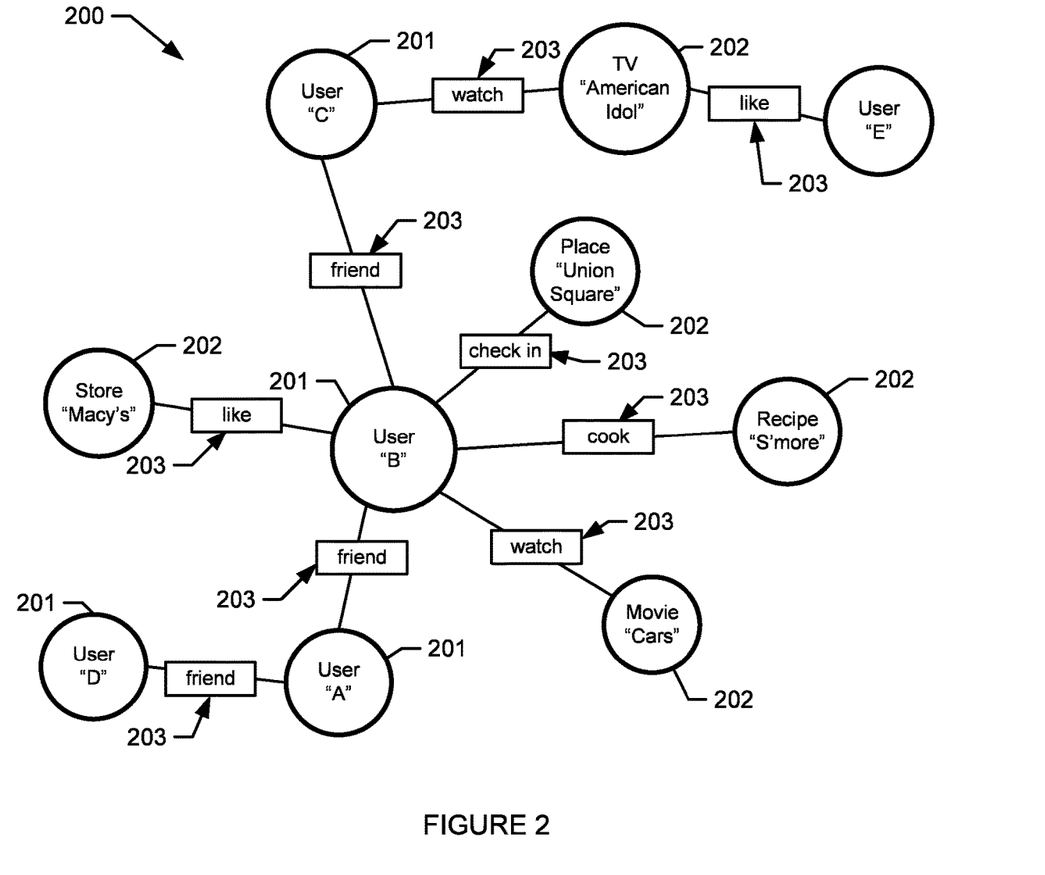
FIG. 2 illustrates an example social graph.

FIG. 2 illustrates an example social graph 200. In the example of FIG. 2, social graph 200 may include user nodes 201, concept nodes 202, and edges 203 between nodes. An edge 203 between a pair of nodes may represent a relationship (or an action) between the pair of nodes. For example, user "B" is a friend of user "A" and user "C", respectively, as illustrated by the edges between users nodes "B" and "A", and between users nodes "B" and "C." For example, users "C" watches TV show "American Idol", as illustrated by the edges between the "American Idol" concept node and user nodes "C." Similarly, the edge between the user node "B" and the concept node "Macy's" may indicate that user "B" likes "Macy's." The edge between user node "B" and the "Cars" concept node indicates that user "B" watches the movie "Cars." The edge between user node "B" and the "S'more" concept node indicates that user "B" cooks the recipe "S'more." The edge between user node "B" and the "Union Square" concept nodes indicates that user "B" checks in to "Union Square." The edge between user node "E" and the "American Idol" concept node indicates that user "E" likes TV show "American Idol." Note that a social graph can be much larger than social graph 200 illustrated in FIG. 2. For example, a social graph used by Facebook of Menlo Park, Calif. can have a number of nodes in the order of $10^8$, and a number of edges in the order of $10^{10}$.

As described earlier, an edge between a pair of nodes may indicate a direct relationship between the pair of nodes. It is also desirable to determine likelihood of a relationship or an interest between a pair of nodes that are two or more hops away. For example, the social-working system may provide (e.g., via an email or a wall-post) a recommendation (e.g., an advertisement) for "Macy's" to user "B", given the direct relationship represented by the edge between the user node "B" and the concept node "Macy's" as illustrated in FIG. 2. The social-networking system may also provide a recommendation for "Macy's" to first-degree friends of user "B" (e.g., users "C" and "A") as first-degree friends often share comment interests.

Figure 3:
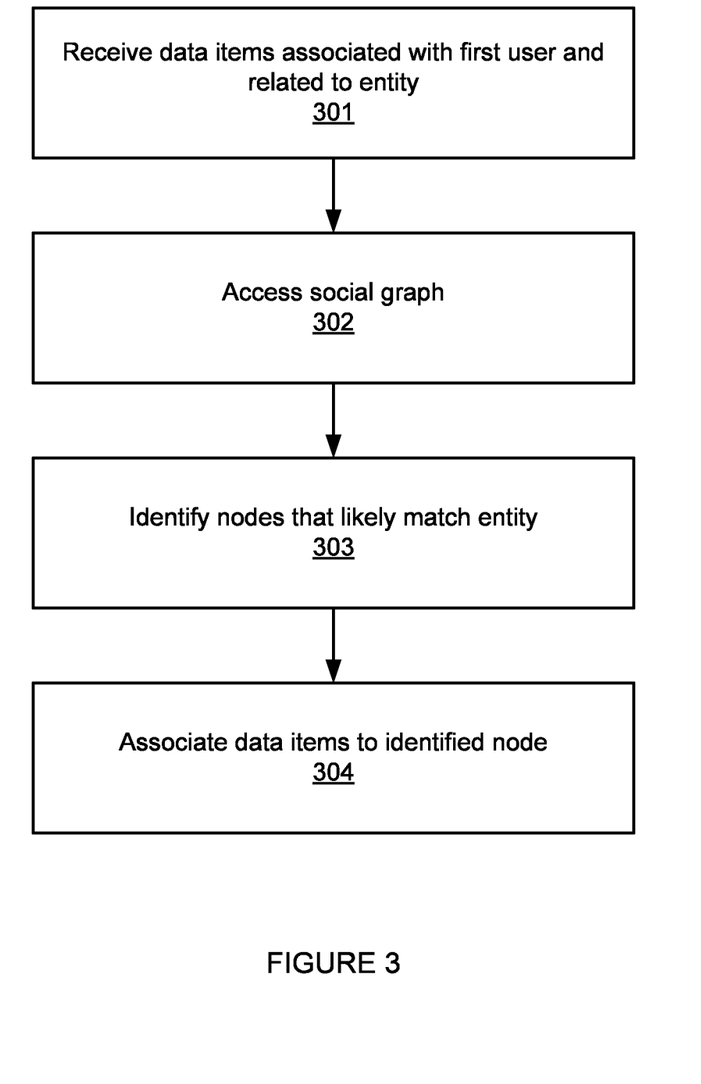
FIG. 3 illustrates an example method of matching contact information to a user or concept of the social-networking system.

FIG. 3 illustrates an example method of matching contact information to a user or concept of the social-networking system. As described earlier, a user of the social-networking system may provide contact information such as a phone number and an email address to be included in a user node corresponding to the user. Meanwhile, the social-networking system may infer contact information for a user by matching available contact information to the user. Particular embodiments herein describe methods of matching contact information related to an entity to a user or a concept of the social-networking system. For example, particular embodiments may access an address book imported to the social-networking system by a first user of the social-networking system, match a contact in the address book to a second user of the social-networking system based on the contact's name, and associate the contact's contact information listed in the address book (e.g., an email address, a phone number) to the second user. The example method of FIG. 3 can be implemented by a contact matching process hosted by one or more computing devices (e.g., servers) of the social-networking system.

In particular embodiments, the contact matching process may receive one or more data items associated with a first user of a social-networking system, the one or more data items being related to an entity (STEP 301). In particular embodiments, the one or more data items may be contact information (e.g., a phone number, an email address, a name, a user identifier of the social-networking system, or any suitable unique identifier of any suitable communication channel or application) for an entity such as a person or a real-world object (e.g., a business, a museum). For example, the first user may import (upload) to the social-networking system contact information of the first user's contacts from the first user's address book stored in the first user's client device (or the first user's address book hosted over the Internet by a remote server) as described earlier. The contact matching process may access the contact information imported by the first user for a name, phone number or email address of an entity (i.e., a contact of the first user) listed in the address book.

In addition to receiving data items related to an entity based on contact information imported by a first user to the social-networking system, particular embodiments may actively seek out data items related to an entity (e.g., a person) based on a "bounce-back" message caused by an email transmitted to the entity by the social-networking system. In particular embodiments, a server-side process hosted by one or more computing devices of the social-networking system may transmit an email to a person. For example, the email may be an invite email for attending an event configured by a first user (or an administrative user of a concept) of the social-networking system. The email may be a reminder email for attending an event configured by a first user of the social-networking system. The email may comprise advertising content for a first user (or a concept) of the social-networking system. In particular embodiments, the email may comprise an embedded object that, upon accessing the email by the person (i.e., the recipient of the email) with an client application running on the person's client device, causes the client application (or another process running on the client device) to transmit a bounce-back message to the social-networking system. In particular embodiments, the bounce-back message may comprise an email address of the person (i.e., the email address that the invite or reminder email is addressed to). The bounce-back message may comprise an identifier of the email or a user identifier of the first user. The bounce-back message may further comprise a time-stamp of the time when the bounce-back message was generated. The bounce-back message may further comprise a copy of browser cookie or other access token installed on the client device by the social-networking system to facilitate user access to the social-networking system. The bounce-back message may further comprise a device identifier of the client device (e.g., a Universally unique identifier or UUID). The contact matching process may receive data items related to the person (e.g., an email address, a device identifier, and so on) by accessing the bounce-back message caused by the email transmitted to the person (and configured by the first user).

In particular embodiments, the contact matching process may access the social graph stored in data stores 101 (STEP 302). The social graph may comprise user nodes, concept nodes, and edges between nodes as described earlier. In particular embodiments, the contact matching process may identify one or more nodes of the social graph that likely match the entity (STEP 303). In particular embodiments, the contact matching process may identify nodes that likely match the entity by comparing at least one of the data items related to the entity to information associated with one or more nodes of the social graph. In particular embodiments, the contact matching process may compare the data items related to the entity to nodes in the social graph that are within a specified degrees of separation from a user node corresponding to the first user. For example, the contact matching process may compare the data items related to the entity to information associated with the first user's first-degree and second-degree friends in the social-networking system. For example, the contact matching process may compare the data items related to the entity to information associated with concept nodes in the social graph that have respective edges directly connecting to a user node corresponding to the first user (e.g., a restaurant that the first user likes, a book store that the first user checks in).

In particular embodiments, the contact matching process may identify nodes that likely match the entity based on a comparison in names. For example, the contact matching process may identify a user node with a user name "Jon Smith" as a likely match to an entity (e.g., an imported contact) with a name "Jonathan Smith." In particular embodiments, the contact matching process may determine a likely match between a text string of a node's name and a text string of the entity's name based on a Levenshtein distance algorithm. For example, the contact matching process may determine a likely match between a node and an entity if a Levenshtein distance between a text string of the node's name and a text string of the entity's name is within a specified threshold (e.g., 5). This disclosure contemplates any suitable methods for determining a likely match in names between a node and an entity.

In some embodiments, the contact matching process may identify nodes that likely match the entity based on a comparison in email addresses. For example, the contact matching process may identify a user node with an email address "johndoe123@gmail.com" as a likely match to an entity (e.g., an imported contact) with an email address "johndoe123@gmail.com" or "johndoe123@yahoo.com."

In other embodiments, the contact matching process may identify nodes that likely match the entity based on declared relationships. For example, the contact matching process may identify a user node with a user name "Mary Williams" as a likely match to an entity (e.g., an imported contact) with a name "Mom", if the first user has declared the user "Mary Williams" as his mother in the social graph.

As described earlier, a bounce-back message corresponding to an email is generated as the email's recipient accesses the email at the recipient's client device. Therefore, a user of the social-networking system that is (or has been recently) active on the client device when the bounce-back message is generated is likely to be the recipient. Particular embodiments may identify nodes of the social graph that likely match an entity related to the bounce-back message (i.e., the recipient of the email causing the bounce-back message) by identifying an active user on the client device when the bounce-back message is generated. In some embodiments, an active user on the client device may be associated with a browser cookie or access token installed on the client device by the social-networking system for facilitating user access to the social-networking system. The contact matching process may, based on the copy of cookie or token included in the bounce-back message, access the social graph and identify an active user associated with the cookie or token (thus a likely match to the recipient). In other embodiments, the contact matching process may identify an active user on the client device based on the device's identifier. For example, as part of a user's connection to the social-networking system from the user's client device, the social-networking system may store the client device's device identifier with the user's user node in data stores 101. The contact matching process may, based on the device identifier included in the bounce-back message, access data stores 101 and identify an active user associated with the device identifier (thus a likely match to the recipient). The contact matching process may further determine whether the identified user is active when the bounce-back message is generated based on the time stamp included in the bounce-back message and the identified user's connection history stored in data stores 101.

Note that nodes that likely match an entity may be identified based on different methods using different data items related to the entity as described above. Particular embodiments may rank the identified nodes by determining confidence scores (in matching the entity) for the identified nodes based on the data items related to the entity. For example, the contact matching process may assign a confidence score of 0.74 if the node is a likely match based on imported contact information as described earlier. For example, the contact matching process may assign a confidence score of 1.0 to a node if the node is a likely match based on information included in a bounce-back message corresponding to a reminder email as described earlier, and the node corresponds to a user being in an active connection session with the social-networking system when the bounce-back message is generated. The contact matching process may assign a confidence score of 0.92 to a node if the node is a likely match based on information included in a bounce-back message corresponding to an invite email as described earlier, and the node corresponds to a user being in an active connection session with the social-networking system when the bounce-back message is generated. The contact matching process may assign a confidence score of 0.87 to a node if the node is a likely match based on information included in a bounce-back message corresponding to a reminder email as described earlier, and the node corresponds to a user having been recently (but not currently) in an active connection session with the social-networking system when the bounce-back message is generated. The contact matching process may assign a confidence score of 0.56 to a node if the node is a likely match based on information included in a bounce-back message corresponding to an advertising email as described earlier. In particular embodiments, the confidence scores described above may be determined using a machine learning algorithm trained on empirical data.

In some embodiments, the contact matching process may adjust the confidence score for a node based on the node's relationship to the first user. For example, the contact matching process may multiply a node's confidence score by 0.9 if the node is within one degree of separation from a user node of the first user, and may multiply the node's confidence score by 0.8 if the node is two or more degrees of separation away from the user node of the first user. In other embodiments, the contact matching process may determine an affinity score between a node and the first user. An affinity score may be 1.0 if the node's corresponding user is the first user's immediate family members (e.g., parents, siblings). An affinity score may be 0.9 if the node's corresponding user frequently communicates with the user. An affinity score may be 0.7 if the node's corresponding user is the user's first-degree social contact in the social graph. Interaction between users on a social-networking system, such as chats, wall posts, emails, and the like, can also be used in scoring affinities between users of the social-networking system. Methods of measuring affinity scoring are described later. The contact matching process may adjust the confidence score for a node by multiplying the confidence score by the node's affinity score with the first user.

In particular embodiments, the contact matching process may rank nodes that likely match the entity based on respective confidence scores. The contact matching process may calculate an aggregated ranking score for each of the likely matched nodes. For example, a first node may be a likely matched node to an entity based on two messages corresponding to invite emails (e.g., each having a confidence score of 0.87), and a likely matched node to the entity based on an imported contact (e.g., confidence score of 0.74). A second node may be a likely match node to the entity based on a message corresponding to a reminder email (e.g., a confidence score of 1.0). A third node may be a likely matched node to the entity based on tow imported contacts (e.g., each having a confidence score of 0.87). The contact matching process may calculate an aggregated ranking score of $$\frac{0.87 \times 2 + 0.74}{(0.87 \times 2 + 0.74) + (1.0) + (0.87 \times 2)} = 0.48$$

for the first node, an aggregated ranking score of $$\frac{1.0}{(0.87 \times 2 + 0.74) + (1.0) + (0.87 \times 2)} = 0.19$$

for the second node, and an aggregated ranking score of $$\frac{0.87 \times 2}{(0.87 \times 2 + 0.74) + (1.0) + (0.87 \times 2)} = 0.33$$

for the third node. In particular embodiments, the contact matching process may determine nodes that may match an entity based on data items related to the entity (e.g., based on imported contact information or bounce-back messages as described earlier), calculate aggregated ranking scores for the nodes, and select the top ranked node (node with the highest aggregated ranking score) as the node that likely matches the entity. In other embodiments, the contact matching process may select a node as a likely match to an entity only if the node's aggregated ranking score exceeds a specified threshold (e.g., 0.80).

In particular embodiments, the contact matching process may associate at least one of the data items to at least one of the identified nodes (STEP 304). For example, the contact matching process may identify a particular node in the social graph that likely matches an imported contact based on substantially matched names between the imported contact and the particular node, and associate the imported contact's email address and phone number to the particular node. For example, the contact matching process may identify a particular user node in the social graph that likely matches a recipient of an email causing a bounce-back message, and associate the email address of the recipient (included in the bounce-back message) to the particular user node. The contact matching process may store in data stores 101 the at least one identified node with data objects corresponding to the at least one data item. In one embodiment, the contact matching process may transmit (e.g., via email) to a user corresponding to an identified user node (or an administrative user of an identified concept node) the one or more data items for confirmation by the user.

Particular embodiments may repeat the steps of the method of FIG. 3, where appropriate. Moreover, although this disclosure describes and illustrates particular steps of the method of FIG. 3 as occurring in a particular order, this disclosure contemplates any suitable steps of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Message Affinity Scoring

In one embodiment, a process running in the social-networking system may request a measure of affinity for a particular user from a module (e.g., an application) that implements an affinity function. The module, in one implementation, may compute the requested measure of affinity by combining (e.g., adding) a weighted set of predictor functions, where each predictor function predicts whether the user will perform a different action. The weights may be provided by the process that requests the measure of affinity, which allows the requesting process to weight the predictor functions differently. That is, the affinity function is tunable by the requesting process for its own purpose. In one implementation, affinities may be computed for the purposes of computing an affinity score of an outgoing message to an intended recipient.

The predictor functions may predict whether a user will perform a particular action based on the user's interest in the action. For example, a predictor function may be derived based on a user's historical activity (such as interacting with other users utilizing the social-networking system functionality discussed above, for example). Additionally, the predictor function may include a decay factor that causes the strength of the signal provided by the user's historical activity to decay with time. The predictor functions may predict any number of actions, which may be within or outside of the social-networking system. For example, these actions may include various types of a user's communications, such as messages, posting of content, and commenting on content; various types of a user's observation actions, such as viewing profiles of other connections and viewing photos and content posted by other connections; and various types of coincidence information about two or more users, such as being tagged in the same photograph, checked in at the same location, and attending the same event. A predictor function may be determined using a machine learning algorithm trained on historical activity and past user responses or data farmed from users by exposing them to various options and measuring responses.

To predict the likely actions a user may take in a given situation, any process running in the social-networking system or outside may request a measure of affinity for a user by providing a set of weights. The measure of affinity may reflect the user's interest in other users, content, actions, advertisements, or any other objects in the social-networking system. The weights may be binary or, more generally, any real number. In one implementation, messages intended for a client device of a subject user that are transmitted or intermediated by the social-networking system, for example, may be processed to compute an affinity between the subject user and the message. The affinity value can be appended to the message prior to transmission to the client device. In other implementations, a process hosted on the client device may access the affinity module to request the measure of affinity. In some implementations, the client device may request affinities between the subject user of the communications device and one or more other users identified in an address book of the subject user (stored locally on the client device or remotely on the social-networking system). Revised affinity values can be obtained during subsequent synchronization processes. The client device may use these affinity values for messages from the respective users. In other implementations, the client device may monitor interactions locally and compute affinity values locally.

Figure 4:
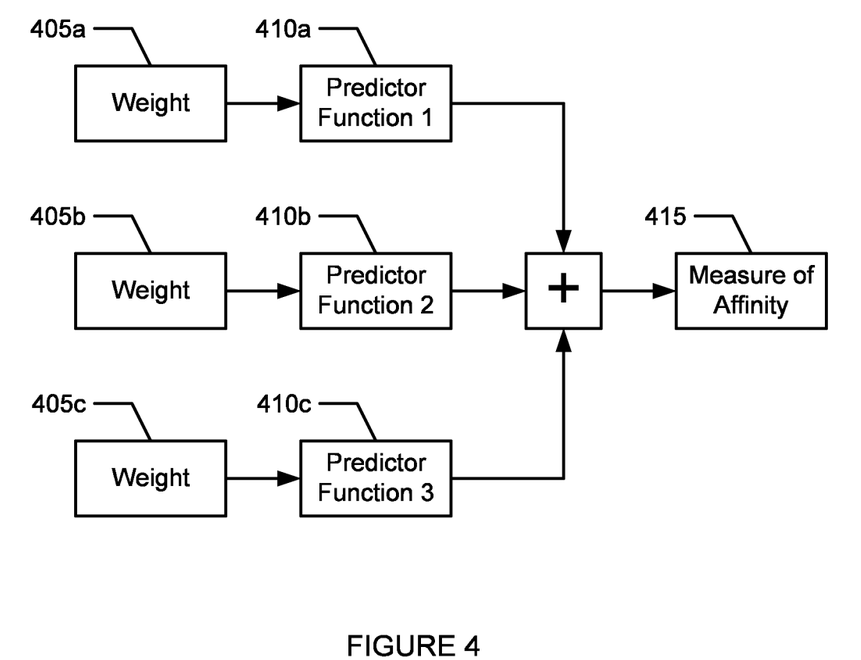
FIG. 4 illustrates an example block diagram for computing a measure of affinity for users in a social-networking system.

FIG. 4 is a block diagram of a function for computing a measure of affinity for users in a social-networking system. To compute a measure of affinity 415 that indicates a set of likely actions a user may want to take in any given situation, weights 405 are applied to predictor functions 410 and then combined to obtain a measure of affinity 415. Although FIG. 4 shows three predictor functions 410, any number of predictor functions can be employed in other embodiments of the invention. Additionally, in the embodiment of FIG. 4, the weighted predictor functions 410 are combined linearly. In different embodiments, other forms of combination may be used, including harmonic means, mean squares, and geometric means. Additionally, multiple measures of affinity 415 with varying weights 405 may be computed before predicting a user's actions.

The weights 405 of the affinity function enable it to be used by various processes in the social-networking system for different purposes. For example, in a process that provides advertisements with social endorsements from a viewer's friends, an ad algorithm may use the measure of affinity 415 function to determine which of a user's connections to mention in the social endorsement or what type of actions to mention in the endorsement. The measure of affinity 415 may then be based on those predictor functions 410 that show how interested the user is in viewing the content posted by another user as well as one or more predictor functions 410 that show how interested the user is in various actions that may be mentioned in the social endorsement. The ad algorithm would thus provide relatively large weights for these predictor functions 410 so that the resulting measure of affinity would more accurately determine which social endorsements would be more interesting to the viewing user. The ad algorithm would then select the social endorsement using the resulting measure of affinity, thereby increasing the likelihood of conversion of the advertisement.

As a second example, in a process for a messaging application that intermediates communications between users, a social algorithm may use the measure of affinity 415 function to determine what level of interest a user may have in a message sent by a particular sending user. The measure of affinity 415 for this purpose may be based on predictor functions 410 that show how interested the user is in viewing the content posted by the user's connections and/or how often the users send messages to one another in general, as well as one or more predictor functions 410 that show how interested the user is posting or accessing different types of messages. Accordingly, the social algorithm would weight these predictor functions 410 relatively high so that the resulting measure of affinity would accurately determine which messages would be more interesting to the viewing user. Because of the highly tunable nature of the affinity function, enabled by the weighted predictor functions 410, it can be used for a number of different purposes.

The social-networking system may comprise an action store storing actions that have been performed by the users of the social-networking system, along with an indication of the time associated with those actions and references to any objects related to the actions. Additionally, the action store may store statistics for specified categories of actions. For example, for a given user the action store may contain the number of wall posts in 30 days by a user, messages sent by the user, number of photos posted by the user in 30 days and number of distinct users that received the user's comments in 30 days. For a given connection between two users, user A and user B, the action store may contain actions such as the number of profile page views from A to B, the number of photo page views from A to B, the number of messages from A to B, and the number of times A and B were tagged in the same photo, and these actions may be associated with a timestamp or may be filtered by a cutoff (e.g., 24 hours, 90 days, etc.). The actions recorded in the action store may be farmed actions, which are performed by a user in response to the social-networking system providing suggested choices of actions to the user. The social-networking system may store the action store in data stores 101 illustrated in FIG. 1.

The social-networking system may comprise a predictor module (e.g., an application) that is responsible for computing a set predictor functions, which predict whether a user will perform a set of corresponding actions. As discussed above, each predictor function may be representative of a user's interest in a particular action associated with the predictor function. The historical activity of a user may be used as a signal of a user's future interest in the same activity. In some embodiments, the predictor function may be generated using a machine learned algorithm that is trained using a user's historical activity associated with an action. The predictor module thus provides a predictor function for each of a set of actions, where a predictor function may take as an input the a user's historical activity and then outputs a measure of the likelihood that the user will engage in the corresponding activity.

In some embodiments, one or more of the predictor functions may use a decay factor in which the strength of the signal from a user's historical activity decays with time. Moreover, different predictor functions may decay the historical activity at different rates. For example, some types of user activity, like adding a new connection, indicate a more persistent interest than other types of activity that indicate a more ephemeral interest, like commenting on another user's status. Therefore, the predictor functions may decay the effect of historical activity based on an understanding about how that activity may become less relevant over the passage of time. Various decay mechanisms may be used for this purpose. For example, a predictor function may use a mathematical function, such as an exponential decay, to decay the statistics about a user behavior. In another embodiment, the decay is implemented by selecting only those statistics about a user behavior that occurred within a specific window of time, such as 24 hours or 30 days.

In one embodiment, a predictor function is realized as a ratio of two affine functions as shown in equation (1). The numerator and denominator affine functions take statistics of the user's historical activity as inputs.

$$P = \frac{a_0 + a_1 x_1 + a_2 x_2 + \ldots + a_n x_n}{b_0 + b_1 x_{n+1} + \ldots + b_m x_{n+m}} \quad (1)$$

where

P is the predictor function 410;

$a_i$ for i=0, 1, 2, ..., N are the coefficients in the numerator affine function;

$b_i$ for i=0, 1, 2, ..., M are the coefficients in the denominator affine function; and $x_i$ for i=1, 2, ..., N+M are the statistics on a user's historical activity related to the predictor function P.

The denominator affine function can represent a normalization of the numerator affine function. For example, the number of comments made by a user may be normalized by, among other statistics, the number of times the user has been active on the social-networking system. In particular, by altering $b_i$ for i=0, 1, 2, ..., M the normalization pattern can be changed. In some embodiments, some or all of the coefficients, $a_i$ for i=0, 1, 2, ..., N and $b_i$ for i=0, 1, 2, ..., M, are determined through machine learning, which may be implemented by the predictor module. In a particular embodiment, a supervised machine learning algorithm is used with the training data obtained through farming, by providing a statistically significant number of users several options and monitoring their response. In another embodiment, the supervised machine learning algorithm is trained entirely based on historical user activity and past responses to choices of actions. The predictor functions may also be non-linear. An example embodiment implements a predictor function for a family where the predictor function includes an 'if-then' construct for the members of the family—i.e., the predictor function is computed differently depending on whether it is being computed for the parents or the children.

Some predictor functions in the social-networking system may predict actions related to a user's communication in the social-networking system. The statistics specifically related to communications may include broadcast data and communication data. Broadcast data may include, for example, the number of photos posted by the user in a given time period, the number of posts via applications by the user in a given time period, and any other communication that the user has posted or otherwise distributed to a group of other users. Communication data may include, for example, the number of likes from the user in a given time period, number of comments posted by user in a given time period, and any other information about the user's communication activities.

Similarly, some predictor functions in the social-networking system may predict actions related to a user's observation of content in the social-networking system. The statistics specifically related to observation may include, for example, the number of profile page views by the user of another user in a given time period, the number of photo views by the user in a given time period, the number of views of an advertisement containing a social endorsement in a given time period, and any other activity involving the viewing of content by the user.

Finally, some predictor functions in the social-networking system may predict actions related to a user's coincidence with one or more other users of the social-networking system. The statistics specifically related to coincidence may include, for example, a rate at which two or more users have been tagged in the same photograph, have checked in at the same location, or have confirmed (e.g., via RSVP) that they will be attending the same event, and any other activity involving an action or object in the social-networking system related to multiple users.

The affinity module provides a measure of affinity 415 based on input data about the user from the social-networking system using the predictor functions 410. The affinity module 760 may sum the predictor functions linearly as shown in equation (2). However, other implementations are equally feasible.

$$A = \beta_0 + \beta_1 P_1 + \beta_2 P_2 + \ldots + \beta_s P_s \qquad (2)$$

where
A is the measure of affinity 415 requested;
$P_i$ for i=0, 1, 2, . . . , s are the s predictor functions 410 in the social-networking system; and
$\beta_i$ for i=1, 2, . . . , s are the weights 405 assigned to the s predictor functions 410 in the social-networking system.

Figure 5:
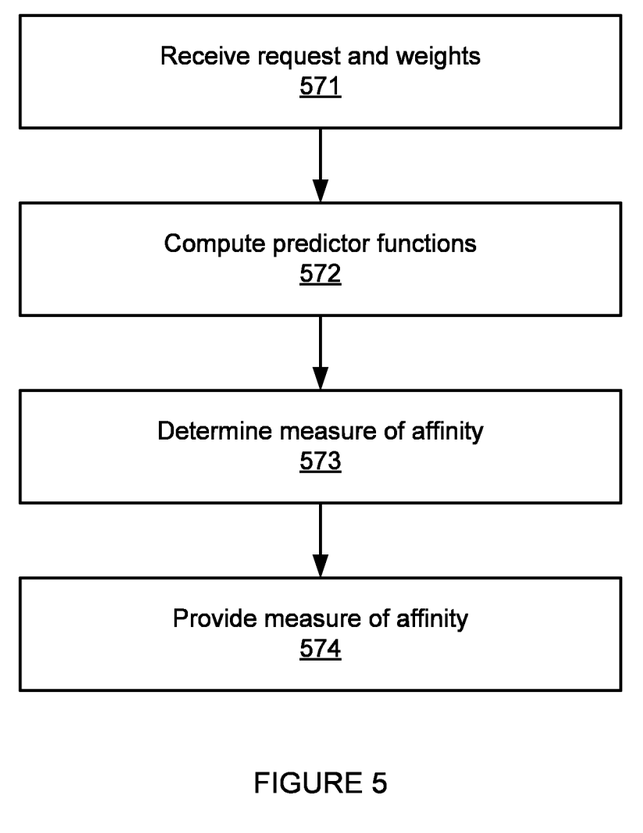
FIG. 5 illustrates an example method for computing a measure of affinity for a user based on a request.

FIG. 5 illustrates an embodiment of a method for computing a measure of affinity 415 for a user based on a request. The social-networking system first receives a request from a process for a measure of affinity 415 for a user along with the weights 405 to be assigned to the various predictor functions 410 (STEP 571). The request may include the message for which an affinity score is desired or one or more attributes extracted from the message. The social-networking system then computes the predictor functions 410 for the user in the predictor module (STEP 572). The predictor functions 410 previously computed are combined to determine an overall measure of affinity 415 (STEP 573), which is then provided to the requesting process (STEP 574).

Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
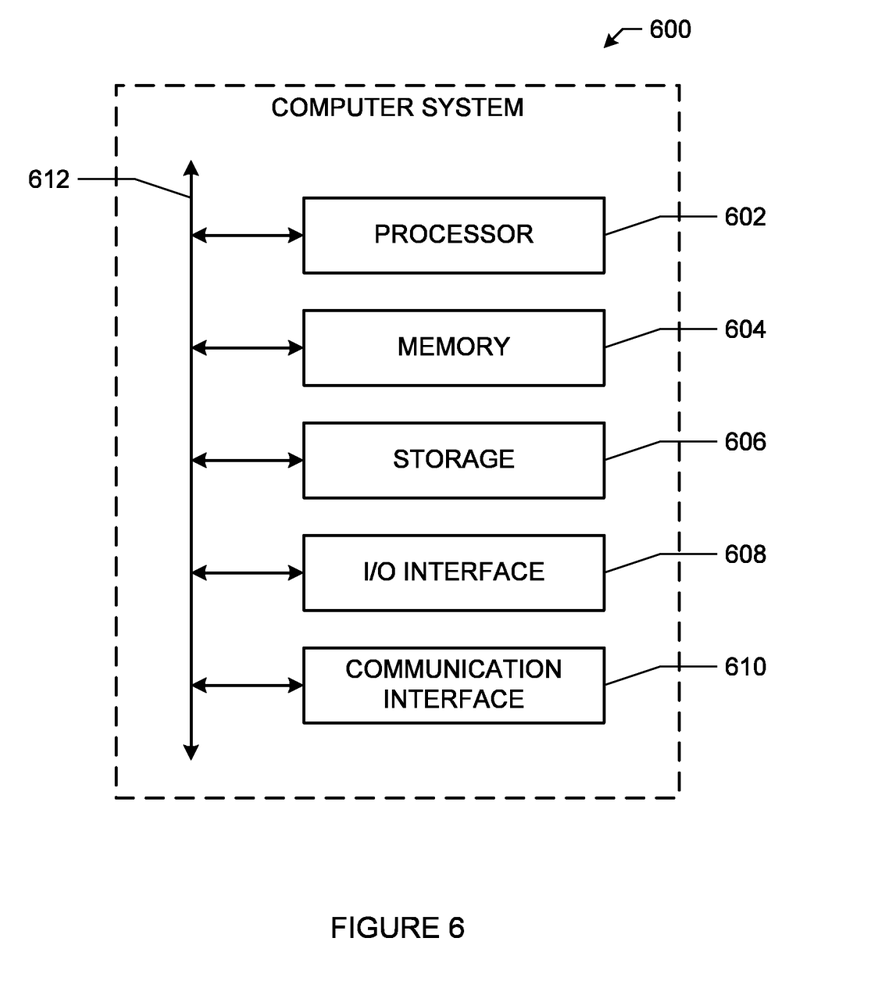
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a desktop computer system, a mobile computer system, a game console, a mainframe, a mesh of computer systems, a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network (e.g., a 602.11a/b/g/n WI-FI network), a WI-MAX network, a cellular network (e.g., a Global System for Mobile Communications (GSM) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 612 may include one or more buses 612, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more processors, in response to determining that an account in a social-networking system includes an incomplete set of information, sending an email to a user associated with the account, wherein the email contains an embedded object that, upon accessing the email by the user on a device, causes an application associated with the social-networking system on the device to transmit a bounce-back message to the social-networking system;
by the one or more processors, receiving the bounce-back message corresponding to the email message, wherein the bounce-back message includes a copy of a token stored on the device, and wherein the token is indicative of additional information about the user; and
by the one or more processors, updating incomplete set of information in the account with the additional information about the user.

2. The method of claim 1, wherein the email message is sent to an address associated with the account based on an unverified indication that the address is associated with the account.

3. The method of claim 2, wherein the unverified indication comprises an indication of a relationship between the device and the account.

4. The method of claim 1, wherein the bounce-back message is automatically sent when a recipient of the initial message accesses the initial message.

5. The method of claim 1, wherein the token comprises a browser cookie corresponding to a website associated with the social-networking system.

6. The method of claim 1, wherein the additional information about the device comprises an email address, a name, a phone number, a user identifier of the social-networking system, a unique identifier of a communication channel or application, or a device identifier.

7. The method of claim 1, wherein a respective initial message is sent to each of a plurality of devices that are likely associated with the account.

8. The method of claim 7, wherein the updating further comprises updating the account with information about each of the plurality of devices with corresponding bounce-back messages having tokens that identify the account.

9. The method of claim 7, further comprising:
determining that at least one of the plurality of devices that are likely associated with the account is not actually associated with the account based on a foreign token in a corresponding bounce-back message for the at least one of the plurality of devices.

10. The method of claim 1, further comprising:
identifying one or more devices that likely match the account; and
sending a respective initial message to each of the one or more devices.

11. One or more computer-readable non-transitory storage media embodying software that is operable when executed to:
in response to determining that an account in a social-networking system includes an incomplete set of information, send an email to a user associated with the account, wherein the email contains an embedded object that, upon accessing the email by the user on a device, causes an application associated with the social-networking system on the device to transmit a bounce-back message to the social-networking system;
receive the bounce-back message corresponding to the email message, wherein the bounce-back message includes a copy of a token stored on the device, and wherein the token is indicative of additional information about the user; and
update the incomplete set of information in the account with the additional information about the user.

12. The media of claim 11, wherein the email message is sent to an address associated with the account based on an unverified indication that the device is associated with the account.

13. The media of claim 12, wherein the unverified indication comprises an indication of a relationship between the device and the account.

14. The media of claim 11, wherein the bounce-back message is automatically sent when a recipient of the initial message accesses the email message.

15. The media of claim 11, wherein the token comprises a browser cookie corresponding to a website for the system.

16. The media of claim 11, wherein the additional information about the device comprises an email address, a name, a phone number, a user identifier of the social-networking system, a unique identifier of a communication channel or application, or a device identifier.

17. The media of claim 11, wherein a respective initial message is sent to each of a plurality of devices that are likely associated with the account.

18. The media of claim 17, wherein the updating further comprises updating the account with information about each of the plurality of devices with corresponding bounce-back messages having tokens that identify the account.

19. The media of claim 17, wherein the software is further operable to:
determine that at least one of the plurality of devices that are likely associated with the account is not actually associated with the account based on a foreign token in a corresponding bounce-back message for the at least one of the plurality of devices.

20. A system comprising:
one or more processors; and
a memory coupled to the processors comprising instructions executable by the processors, the processors operable when executing the instructions to:
in response to determining that an account in a social-networking system includes an incomplete set of information, send an email to a user associated with the account, wherein the email contains an embedded object that, upon accessing the email by the user on a device, causes an application associated with the social-networking system on the device to transmit a bounce-back message to the social-networking system;
receive the bounce-back message corresponding to the email message, wherein the bounce-back message includes a copy of a token stored on the device, and wherein the token is indicative of additional information about the user; and
update the incomplete set of information in the account with the additional information about the user.

* * * * *